(12) United States Patent
Leuthold

(10) Patent No.: US 6,182,962 B1
(45) Date of Patent: Feb. 6, 2001

(54) DEVICE AND PROCESS FOR SEPARATING A SHEET ARTICLE FROM A STACK

(75) Inventor: Karl Leuthold, München (DE)

(73) Assignee: Giesecke & Devrient GmbH, Munich (DE)

(*) Notice: Under 35 U.S.C. 154(b), the term of this patent shall be extended for 0 days.

(21) Appl. No.: 09/068,982
(22) PCT Filed: Nov. 22, 1996
(86) PCT No.: PCT/EP96/05174
   § 371 Date: Jul. 28, 1998
   § 102(e) Date: Jul. 28, 1998
(87) PCT Pub. No.: WO97/19011
   PCT Pub. Date: May 29, 1997

(30) Foreign Application Priority Data

Nov. 23, 1995 (DE) .............................. 195 43 634

(51) Int. Cl.$^7$ ....................................... B65H 1/18
(52) U.S. Cl. ................. 271/152; 271/265.04; 271/155; 271/97; 271/126; 271/128
(58) Field of Search .................. 271/152, 153, 271/155, 97, 31, 126, 128, 265.04

(56) References Cited

U.S. PATENT DOCUMENTS

| Re. 27,869 | * | 1/1974 | Willits et al. ...................... 235/92 |
| 3,813,523 | * | 5/1974 | Mohan et al. ...................... 235/92 |
| 3,835,306 | * | 9/1974 | Bills et al. ........................ 235/92 |
| 4,052,051 | * | 10/1977 | Mersereau et al. ................ 271/94 |
| 4,227,071 | * | 10/1980 | Tomyn .............................. 235/92 |
| 4,232,218 | * | 11/1980 | Kenton et al. ................... 250/222 |
| 4,298,790 | * | 11/1981 | Decker et al. .................... 235/92 |
| 4,680,806 | * | 7/1987 | Bolza-Schunemann ............ 382/65 |
| 4,962,538 | * | 10/1990 | Eppler et al. ...................... 382/1 |
| 5,005,192 | * | 4/1991 | Duss ................................. 377/8 |
| 5,040,196 | * | 8/1991 | Woodward ......................... 377/8 |
| 5,202,554 | * | 4/1993 | Wilton et al. .................. 250/222.2 |
| 5,207,416 | * | 5/1993 | Soler ................................ 271/31 |
| 5,295,678 | * | 3/1994 | Lindner et al. ................... 271/152 |
| 5,335,899 | * | 8/1994 | Golicz ............................... 271/34 |
| 5,347,350 | * | 9/1994 | Nakahata et al. .................. 355/309 |
| 5,534,690 | * | 7/1996 | Goldenberg et al. ............ 250/222.1 |
| 5,988,629 | * | 11/1999 | Burlew et al. ................... 271/152 |

FOREIGN PATENT DOCUMENTS

405254675A * 10/1933 (JP) .
360112547A * 6/1985 (JP) .
 61-295934    12/1986 (JP) .

* cited by examiner

Primary Examiner—Donald P. Walsh
Assistant Examiner—David A Jones
(74) Attorney, Agent, or Firm—Bacon & Thomas, PLLC

(57) ABSTRACT

In an apparatus for separating sheet material from a stack, the latter rests on a movable pressure plate, by adapted to feed the stack to a withdrawal device. The pressure under which the stack is urged against the withdrawal device is dependent upon the density of the stack. For determining the density, the apparatus comprises a density sensor which determines the density of the stack continuously during the separation process at least in the region of the withdrawal device.

12 Claims, 2 Drawing Sheets

DEVICE AND PROCESS FOR SEPARATING A SHEET ARTICLE FROM A STACK

BACKGROUND OF THE INVENTION

1. Field of the Invention

The invention relates to an apparatus for and a method of separating sheet material, such as e.g. banknotes, from a stack.

2. Description of Related Art

Such an apparatus is known for example from DE-OS 34 47 777. By means of a movable pressure plate, a stack disposed on the pressure plate is fed towards a withdrawal means. The withdrawal means is a device that may include, among other things, a feed means, a retaining means, a separating roller and a retaining roller. For separating the sheet material, the pressure plate is moved towards the withdrawal means until the stack is urged against the feed means with slight pressure. Thereafter, the respective uppermost sheet of the stack is moved by the feed means in the direction towards the separating roller which then separates this sheet from the stack.

A disadvantage of the apparatus consists in that the slight pressure for urging the stack against the feed means cannot be held very constant during the entire separation process. This holds in particular for stacks of worn sheet material, such as e.g. banknotes that are wavy or kinked at various locations.

SUMMARY OF THE INVENTION

In view of the above disadvantage, it is the object of the invention to suggest an apparatus for and a method of separating sheet material in which the sheet material stack is urged against the feed means of the withdrawal means with an optimum pressure during the entire separation process.

The basic idea of the invention in essence consists in determining the thickness of the stack by means of a density sensor at least in the region of the withdrawal means in continuous manner during the separation process, and in matching or adjustung the distance between the pressure plate and the withdrawal means in accordance with the density determined in optimum manner with the aid of a control means. In this respect, the density determined for the banknote stack in the region of the withdrawal means is a measure of the pressure with which the stack is pressed against the withdrawal means.

An advantage of the apparatus consists in that the density determined depends in essence on the condition of the uppermost sheets in the stack. The pressure proportional to this density thus can be kept constant during the entire separation process of the stack. It is immaterial in this respect how many sheets are still contained in the sheet or how large the absolute distance between pressure plate and withdrawal means is. When the pressure of the stack against the withdrawal means is too low, it may easily be increased by reducing the distance between pressure plate and withdrawal means. In case the pressure is too high, it may be reduced by increasing the distance. In this manner, a dynamic control loop is formed ensuring a constant pressure of the stack against the withdrawal means irrespective of the condition or the thickness of the stack.

In a preferred embodiment of the invention, the density sensor comprises an air blast nozzle blowing air between the sheets of the stack and causing the sheets of the stack to oscillate. The oscillations of the stack cause noise detected by means of a microphone. The control means determines the density of the stack from this detected noise.

BRIEF DESCRIPTION OF THE DRAWINGS

Further features and embodiments of the invention are gatherable from the subclaims. In the following, the invention shall be described with reference to the drawings in which

DETAILED DESCRIPTION OF THE PREFERRED EMBODIMENTS

Figure 1:
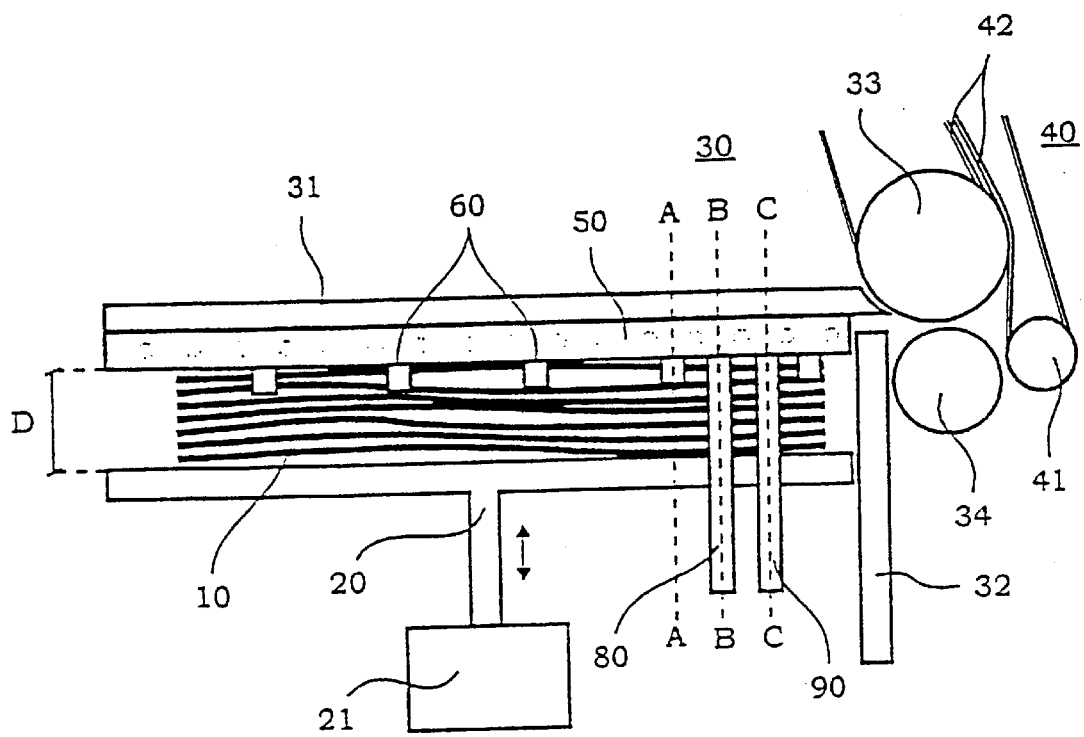
FIG. 1 shows a schematic diagram of an embodiment of the invention.

FIG. 1 illustrates an embodiment of the invention in a side view. Stack 10 consists of a number of sheets, which are shown in wavy form here. Stack 10 rests on a movable pressure plate 20 by means of which stack 10 is fed to a withdrawal means 30. The withdrawal means 30 comprises a feed means 31, a retaining means 32, a separating roller 33 and a retaining roller 34.

For separating the uppermost sheet of stack 10, the sheet is transported through feed means 31, which may be designed as an air conducting plate, for example, in the direction of the separating roller 33. The latter then grasps the uppermost sheet and withdraws the same from stack 10. The sheets of stack 10 following the uppermost sheet are retained by retaining means 32. In the event that feed means 31 conveys several sheets in the direction towards separating roller 33, retaining roller 34 is provided in addition, which then conveys the sheets following the uppermost sheet back into stack 10.

The sheet separated by the withdrawal means 30 may then be passed, as shown for example in the instant case, to a transport system 40. The latter in essence comprises transport rollers 41 for moving transport belts 42. For transportation, the sheet material is clamped between the transport belts 42.

The distance D between pressure plate 20 and withdrawal means 30 can be altered by moving the pressure plate 20 in upward and downward directions, respectively, with the aid of a control means 21. For adjusting the distance D in optimum manner during the entire separation process, the density of stack 10 is determined continuously during separation at least in the region of the withdrawal means 30. For determining the density, various embodiments of density sensors are illustrated herein simultaneously. Normally, it is of course sufficient to select one of the density sensors indicated hereinafter.

Figure 2:
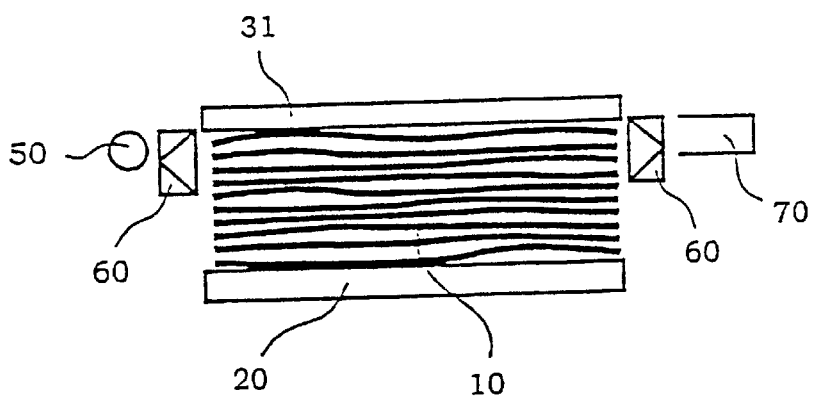
FIG. 2 shows a sectional view of the embodiment along sectional line A.

FIG. 2 shows a schematic diagram of the embodiment along sectional line designated A in FIG. 1. In a preferred embodiment of the density sensor, air is blown between the sheets of stack 10 by means of a blast nozzle 50. By way of this blown-in air, the sheets of stack 10 are caused to oscillate. A microphone 60 then detects the noise produced by the oscillations of the sheets. Microphone 60 is disposed preferably on the same side of stack 10 as air blast nozzle 50. An arrangement of microphone 60 on the opposite side of stack 10 is possible as well. As shown in FIG. 1, air blast nozzle may be designed to extend across the entire length of sheet material stack 10, so that it is also possible to employ several microphones 60 for detecting the noise caused by the oscillations of the sheets.

On the basis of the noise detected by one or more microphones 60, the control means continuously determines the density of stack 10. Depending on the density determined, control means 21 continuously adjusts the distance D between pressure plate 20 and withdrawal means 30, so that stack 10 is urged against withdrawal means 30 in optimum manner.

In a second embodiment, the density sensor again comprises an air blast nozzle 50 and an air pressure sensor 70. Air blast nozzle 50 and air pressure sensor 70 are disposed on opposite sides of stack 10. Air pressure sensor 70 detects the pressure of the air passing through stack 10. By means of control means 21, the density of stack 10 then is determined continuously from the detected pressure and distance D is adjusted in optimum manner. It is possible here, too, to employ one or more air pressure sensors 70. The number and extension, respectively, of the air pressure sensors 70 can be optimized for the apparatus.

Figure 3:
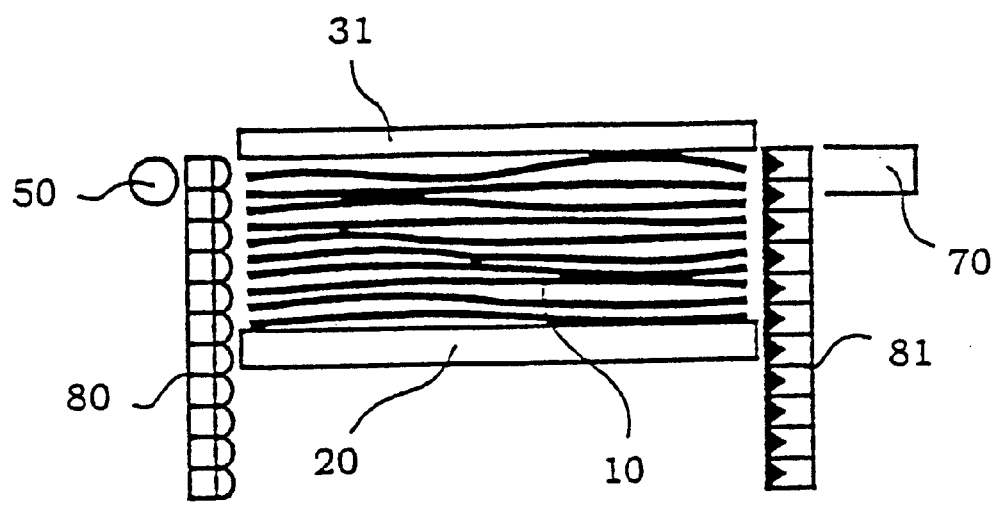
FIG. 3 shows a sectional view of the embodiment along sectional line B.

FIG. 3 is a sectional view along sectional line B in FIG. 1, illustrating another embodiment of a density sensor. The latter comprises a light source 80 and a light sensor 81 disposed on opposite sides of stack 10. For determining the density, the light source illuminates the stack 10 on one side, and light sensor 81 detects the light passing through stack 10. The density of stack 10 then is determined from the light detected, and distance D is adjusted in optimum manner.

The light source employed, in addition to simple illumination systems such as e.g. incandescent lamps or LEDs, may also be LED arrays. The light sensor can comprise, for example, a photodiode, a photodiode array or a CCD array.

It is possible by using, for example, an LED array and a photodiode array, to determine the density of stack 10 in various sections of stack 10. For example, in case densities occur in the lower sections of stack 10 which with great likelihood, result in an interference during separation, measures can be taken at an early stage for eliminating such densities. Some of these measures are already known from the prior art. It is of course also possible to design the other embodiments of a density sensor as described hereinbefore in the form of an array, if required.

Figure 4:
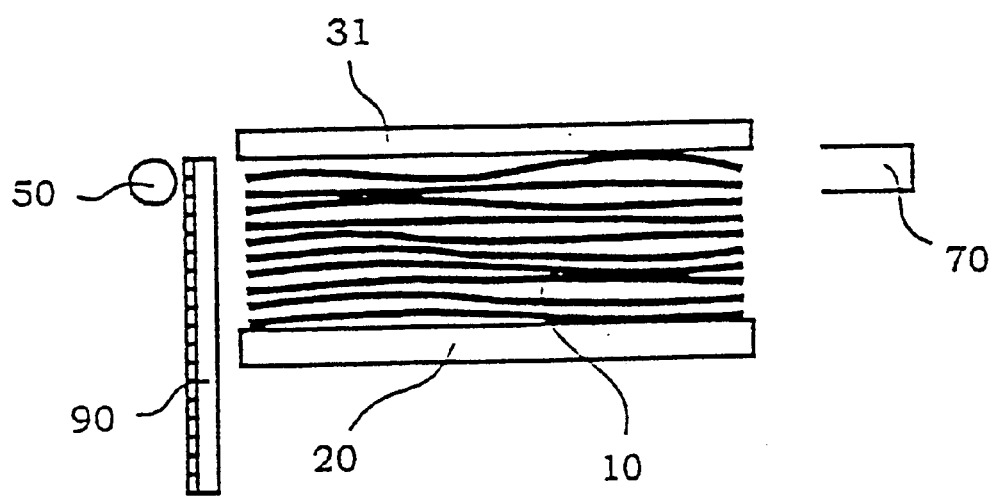
FIG. 4 shows a sectional view of the embodiment along sectional line C.

FIG. 4 shows a sectional view along sectional line C in FIG. 1. In this illustrated embodiment of a density sensor, a CCD camera 90 is provided, producing an image of the sheet edges of stack 10. On the basis of this image, the number of the sheet edges in the region of the withdrawal means 30 is determined by counting. The density of stack 10 results from the number of sheet edges in each region.

In addition to the CCDs necessary for generating the image, the CCD camera may also contain an illumination system illuminating the sheet edges. Preferably, a CCD line camera is employed that may extend, if necessary, also along the entire stack 10, for being able to determine, for example, densities in the lower sections of stack 10 as well.

What is claimed is:

1. An apparatus for separating sheet material from a stack, including a movable pressure plate on which the stack rests, said movable pressure plate being arranged to feed the stack to a withdrawal device arranged to separate and withdraw an uppermost sheet from the stack, wherein said apparatus comprises:

a density sensor arranged to continuously determine a density of at least a portion of said stack during separation of the uppermost sheet from said stack; and a controller arranged to control a distance between said pressure plate and said withdrawal device in accordance with said density such that said stack is urged against said withdrawal device under a constant contact pressure during said separation of said uppermost sheet from said stack.

2. An apparatus as claimed in claim 1, wherein said density sensor comprises an air blast nozzle arranged to blow air between sheets of said stack, causing the sheets of the stack to oscillate; and a microphone arranged to detect noise caused by oscillations of the sheet.

3. An apparatus as claimed in claim 1, wherein said density sensor comprises an air blast nozzle arranged to blow air between sheets of said stack from one side of said stack; and an air pressure sensor arranged to detect a pressure of air passing through said stack from said one side to an opposite side of said stack.

4. An apparatus as claimed in claim 1, wherein said density sensor comprises a light source arranged to illuminate one side of said stack; and a light sensor arranged to detect light passing through said stack from said one side to an opposite side of said stack.

5. An apparatus as claimed in claim 4, wherein said light source comprises an LED array.

6. An apparatus as claimed in claim 4, wherein said light sensor comprises a photodiode array or a CCD array.

7. An apparatus as claimed in claim 4, wherein said density sensor comprises a CCD camera arranged to produce an image of edges of sheets in said stack.

8. A method of separating sheet material from a stack, wherein the stack is placed on a pressure plate, the stack is fed by the pressure plate to a withdrawal device, and the withdrawal device separates an uppermost sheet from the stack, comprising the steps of:

continuously determining a density of at least a portion of the stack during separation of the uppermost sheet from the stack;

adjusting a distance between the pressure plate and the withdrawal device in accordance with said density, such that the stack is urged against the withdrawal device under a constant contact pressure during said separation of the uppermost sheet from the stack.

9. A method as claimed in claim 8, wherein the step of determining the density of the stack comprises the steps of blowing air between sheets of the stack so that the sheets are caused to oscillate; detecting noise resulting from oscillations of the sheets of the stack; and determining the density of the stack based on the detected noise.

10. A method as claimed in claim 8, wherein the step of determining the density of the stack comprises the steps of blowing air between the sheets of the stack; detecting a pressure of air transmitted through the sheets of the stack; and determining a density of the stack based on the detected pressure.

11. A method as claimed in claim 8, wherein the step of determining the density of the stack comprises the steps of laterally illuminating sheets of the stack with a light; detecting light transmitted through the sheets of the stack; and determining a density of the stack based on the detected light.

12. A method as claimed in claim 8, wherein the step of determining the density of the stack comprises the steps of producing an image of edges of sheets in the stack; determining a number of the sheet edges by counting; and determining a density of the stack based on the number of sheet edges.

* * * * *